United States Patent
Sher et al.

(10) Patent No.: US 11,116,234 B2
(45) Date of Patent: *Sep. 14, 2021

(54) READY-TO-DRINK MILK BASED BEVERAGES WITH IMPROVED TEXTURE AND STABILITY

(71) Applicant: SOCIETE DES PRODUITS NESTLE S.A., Vevey (CH)

(72) Inventors: Alexander A. Sher, Dublin, OH (US); Yubin Ye, Dublin, OH (US); Margaret Schneider, Dublin, OH (US); Philippe Rousset, Dublin, OH (US); Virginie Kapchie, Dublin, OH (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/761,152

(22) PCT Filed: Nov. 1, 2018

(86) PCT No.: PCT/EP2018/079919
§ 371 (c)(1),
(2) Date: May 1, 2020

(87) PCT Pub. No.: WO2019/086565
PCT Pub. Date: May 9, 2019

(65) Prior Publication Data
US 2020/0337326 A1    Oct. 29, 2020

Related U.S. Application Data

(60) Provisional application No. 62/580,872, filed on Nov. 2, 2017.

(51) Int. Cl.
| A23C 9/154 | (2006.01) |
|---|---|
| A23C 9/15 | (2006.01) |
| A23F 5/14 | (2006.01) |
| A23G 1/56 | (2006.01) |
| A23L 2/66 | (2006.01) |
| A23L 2/68 | (2006.01) |

(52) U.S. Cl.
CPC ........... *A23C 9/1542* (2013.01); *A23C 9/1512* (2013.01); *A23C 9/1516* (2013.01); *A23F 5/14* (2013.01); *A23G 1/56* (2013.01); *A23L 2/66* (2013.01); *A23L 2/68* (2013.01)

(58) Field of Classification Search
CPC ... A23C 9/1542; A23C 9/1512; A23C 9/1516; A23F 5/14; A23G 1/56; A23L 2/66; A23L 2/68
USPC ......................................................... 426/584
See application file for complete search history.

(56) References Cited

U.S. PATENT DOCUMENTS

| 2005/0266138 | A1 | 12/2005 | Yuan et al. | |
|---|---|---|---|---|
| 2011/0020507 | A1* | 1/2011 | Yuan | A23C 9/1542 426/231 |
| 2016/0113987 | A1* | 4/2016 | Choi | A61K 2300/00 424/439 |
| 2020/0383347 | A1* | 12/2020 | Sher | A23C 9/156 |

FOREIGN PATENT DOCUMENTS

| WO | 2015185372 | 12/2015 | |
|---|---|---|---|
| WO | WO-2016066788 A1 * | 5/2016 | ........... A23C 9/1522 |
| WO | 2017021428 | 2/2017 | |
| WO | 2017021431 | 2/2017 | |
| WO | 2017063942 | 4/2017 | |
| WO | 2017148920 | 9/2017 | |
| WO | 2018197368 | 11/2018 | |

* cited by examiner

*Primary Examiner* — Brent T O'Hern
(74) *Attorney, Agent, or Firm* — K&L Gates LLP

(57) ABSTRACT

The present invention relates to clean label beverage products. In particular, the invention is concerned with combination of a protein system induced by controlled aggregation of milk proteins and only one hydrocolloid, high acyl gellan gum, which imparts outstanding sensory attributes on beverage product, in particular when containing reduced fat/sugar. A method of producing such beverage and the products obtainable from the method are also part of the present invention. The present invention also relates to a RTD coffee beverage.

19 Claims, No Drawings

READY-TO-DRINK MILK BASED BEVERAGES WITH IMPROVED TEXTURE AND STABILITY

CROSS REFERENCE TO RELATED APPLICATIONS

The present application is a National Stage of International Application No. PCT/EP2018/079919, filed on Nov. 1, 2018, which claims priority to U.S. Provisional Patent Application No. 62/580,872, filed on Nov. 2, 2017, the entire contents of which are being incorporated herein by reference.

FIELD OF THE INVENTION

The present disclosure generally relates to milk containing beverages with improved texture/mouthfeel by controlled protein aggregation (CPA) at ultra-high temperature (UHT) treatment conditions using all-in-one process, the beverage is devoid of artificial ingredients for system stabilization and texture/mouthfeel. More specifically, the present disclosure relates to ready to drink (RTD) reduced fat/sugar beverages containing milk and a hydrocolloid based stabilizing system and also relates to methods for making the same.

BACKGROUND OF THE INVENTION

The current trend is that consumers are more health conscious and are looking for healthier beverages such as fat-free and reduced sugar without compromising the product taste and texture. Furthermore, yet another trend is clean labeling of foods which is becoming as an industry wide commitment. The term "clean label" is the advertising of foods with the indication that the product does not containing specific ingredients. This usually affects those substances which the consumer perceives as unhealthy or reject for any other reason, e.g. dyes, preservatives, artificial flavors, flavor enhancers, genetically modified foods, hydrogenated fatty acids, and other ingredients which are artificial or perceived to be artificial and/or unfamiliar, or have reduced number of ingredients without compromising product quality characteristics. Thus, many RTD beverages are transitioning from high number of ingredients to reduced number of ingredients, from eliminating artificial ingredients to natural ones, from high sugar and/or fat formulations to versions with less sugar and/or fat to limit the calories in the beverage. However, sugar and/or fat reduction results in a thin, less pleasing mouthfeel of the beverages. Therefore, there is a need for a solution that improves and compensates the loss of mouthfeel in reduced sugar/fat RTD milk beverages, without adding additional or large number of gums or stabilizers, to maintain consumer preference.

It is critical not only to enhance texture/mouthfeel of RTD milk beverage but also have stable liquid beverages without compromising product stability over shelf life (at least 6 months at refrigeration for extended shelf life (ESL) products; and 7 months at refrigeration, 6 months at 20° C., 4 months at 30° C. and 2 months at 38° C. for aseptic products). Today a lot of beverages utilize large number of stabilizers, including artificial ingredients.

The present invention relates to stabilizing systems and composition of shelf-stable aseptically packaged liquid RTD milk beverages, devoid of artificial ingredients for system stabilization and texture/mouthfeel, and to the process of making beverages thereof.

SUMMARY OF THE INVENTION

The present disclosure provides a ready-to-drink (RTD) reduced fat/sugar milk beverage and also provides methods for making such beverages. The RTD milk beverages can be extended shelf life (ESL) or aseptic, and can have a pleasant mouthfeel. The RTD milk beverages can have an improved physico-chemical stability during storage, e.g., stable for at least 7 months at refrigeration for ESL products; and 7 months at refrigeration, 6 months at 20° C., 4 months at 30° C. and 2 months at 38° C. for aseptic products. The milk beverage eliminates gelation and overcomes problems with other phase separation/instability issues during different storage conditions over the full life of the milk beverages.

The objective of the present invention relates to solving the problems of (i) lack of texture/mouthfeel in reduced fat/sugar RTD and (ii) physical instability issues of reduced fat/sugar RTD.

The benefits of the present invention includes the following:
  Limited number of total ingredients in the beverage and avoid artificial ingredients for texture and stability;
  Significantly simplified process in aseptic dairy RTD beverages;
  Ability to produce low calories aseptic RTD beverages with indulgent creamy, thick product texture/mouthfeel;
  Enable the product to keep the unique texture and taste during its shelf life;
  Provide enhanced shelf-life physical stability without syneresis, sedimentation, creaming; and
  Avoid gelation issues.
  Thus, the present invention now solves the foregoing problems by providing a stable low fat and low sugar beverage composition having an enhanced or improved organoleptic properties.

In one aspect, the present invention relates to a ready to drink (RTD) beverage product comprising: milk, non-fat dry milk, cream, skimmed-milk or semi-skimmed milk, or combinations thereof; added sugar ranging from 1-5 wt/wt %; high-acyl gellan gum ranging from 0.01 to 0.03 wt/wt %; and an acidifier; wherein the beverage comprises casein-whey protein aggregates having a volume based mean diameter value D [4,3] ranges from 5 to 10 µm as measured by laser diffraction and viscosity ranging from 3 to 30 cP measured at 4° C. at shear rate 75 $\sec^{-1}$.

In another aspect, the present invention relates to a ready to drink (RTD) coffee beverage product comprising: milk, non-fat dry milk, cream, skimmed-milk or semi-skimmed milk, or combinations thereof; added sugar ranging from 1-5 wt/wt %; high-acyl gellan gum ranging from 0.01 to 0.03 wt/wt %; and an acidifier comprising coffee; wherein the beverage comprises casein-whey protein aggregates having a volume based mean diameter value D [4,3] ranges from 5 to 10 µm as measured by laser diffraction and viscosity ranging from 3 to 15 cP measured at 4° C. at shear rate 75 $\sec^{-1}$. The coffee is soluble coffee, micronized coffee particles, coffee extract, coffee concentrate and combinations thereof. The coffee comprises *Arabica* or *Robusta* coffee or combination of thereof in concentration ranging from 0.5 to 1.5 wt/wt %.

Provided is the composition of aseptic shelf-stable liquid RTD milk beverage, formed by the interaction of milk proteins (such as casein and whey), carbohydrate(s), and a natural hydrocolloid. The composition may optionally comprise sweetener(s), buffer(s) and flavor(s).

Furthermore, the products of the invention presents excellent organoleptic properties, in particular in terms of texture and mouthfeel even only one hydrocolloid used as a stabilizer. Besides, the products of the invention show good stability over extended product shelf-life. Another aspect of the present invention relates to a method of producing a RTD milk beverage comprising the steps of:

Mixing ingredients as defined above;
adding the acidifier;
Homogenizing the mixture at total pressure ranging from 135-300 bars and temperature ranging from 65-80° C.;
Sterilizing at UHT conditions at 136-150° C. for 3-30 seconds
Cooling the obtained beverage base product to 25° C. or below; and
Filling aseptically UHT beverages in aseptic containers.

DETAILED DESCRIPTION OF THE INVENTION

In the following description, the % values are in wt/wt % unless otherwise specified. The present invention pertains to protein containing beverage, more particularly to RTD beverage. The present invention addresses the following:

Provide clean label by removing of artificial ingredients and reduced total number of ingredients;
Developed beverage with no physical instability issues of reduced fat/sugar RTD milk beverages
Provided stable RTD milk beverages with unique texture and taste during product shelf life There are no current solutions using controlled protein aggregation for shelf stable RTD milk beverages with low sugar/fat content without artificial stabilizers and are shelf-stable during the life of the beverage. Moreover, the current beverages have a large number of stabilizers.

Advantageously and unexpectedly, a unique combination of only one natural hydrocolloid, specific ratio of casein to whey proteins, specific combination of pH, heat and holding time were found to improve beverage texture/mouthfeel and provide a pleasant, smooth creamy taste of reduced fat/sugar RTD milk beverage. In addition, the desired texture improvement and desired product shelf life stability was found only when the homogenization was done prior to applying specific combination of pH, heat and holding time for controlled protein aggregation.

As a result, the reduced fat/sugar RTD milk beverage has improved texture and good physico-chemical stability during shelf life. The beverage of the invention comprises high acyl gellan gum in the range of 0.01 to 0.03 wt/wt %.

The term "reduced fat/sugar" relates to added sugar present in amounts of less than 5 wt/wt % and milk-based fat less than 2 wt/wt % in the RTD beverage. The fat may originate from milk already present as a component in the RTD beverage. In another embodiment, fat may also be added to the RTD beverage as a cream, butter or anhydrous milk fat.

If we use the hydrocolloid outside the above ranges, gelation or phase separation issues (e.g. serum, sedimentation) will occur (examples within and outside of the ranges are provided below).

The beverage comprises casein-whey protein aggregates having a volume based mean diameter value D[4,3] of 5 to 10 µm as measured by laser diffraction.

In one embodiment of the present invention, the acidifier comprises but not limited to lactic acid, glucono delta-lactone, phosphoric acid, ascorbic acid, acetic acid, citric acid, malic acid, hydrochloric acid, or combination of thereof. In one embodiment the acidifier is lactic acid ranging from 0.03 to 0.06 wt/wt %. In another embodiment the acidifier is citric acid ranging from 0.03 to 0.06 wt/wt %.

The term "glucono delta-lactone" is a lactone (cyclic ester) of D-gluconic acid. Upon addition to water, glucono delta-lactone is partially hydrolysed to gluconic acid, with the balance between the lactone form and the acid form established at chemical equilibrium.

In one embodiment of the present invention, the RTD milk beverage further comprises calcium salts for calcium fortification. In one embodiment of the present invention, the calcium salt comprises but not limited to calcium carbonate, calcium phosphate, calcium lactate-citrate, calcium citrate, or combination of thereof.

In another embodiment, the present invention relates to an RTD coffee beverage further comprising sodium bicarbonate and/or potassium bicarbonate instead of calcium salts present in the amounts ranging from 9 to 0.15 wt/wt %.

In an embodiment, the product includes addition of sugar, wherein sugar is sucrose up to about 5 wt/wt %.

In an embodiment, the RTD beverage further comprises additional whey proteins to improve the CPA effect and enrichment in dairy proteins.

In an embodiment, the product includes addition of natural sweeteners.

In an embodiment, the product includes addition of cocoa powder, flavours such as chocolate, vanilla, banana, strawberry, raspberry, milk or combination of thereof.

In an embodiment, the beverage is clean label. It avoids artificial, chemically modified ingredients such as carboxymethyl cellulose, hydroxypropyl cellulose, chemically modified starches, non-familiar, artificially perceived ingredients by consumers such as carrageenans.

Liquid Beverage Composition and Product

A beverage composition according to the invention comprises the RTD milk beverage as described in the present invention and may be any beverage composition, meant to be consumed by a human or animal, such as e.g. a beverage, e.g. a coffee beverage, a cocoa or chocolate beverage, a malted beverage, or a milk based beverage; a performance nutrition product, a medical nutrition product; a milk product, e.g. a milk drink, a product for improving mental performance or preventing mental decline, or a skin improving product.

Beverage or Beverage Composition

A beverage according to the invention comprises the RTD milk beverage as described in the present invention and may e.g. be in the form of a ready-to-drink beverage. By a ready-to-drink beverage is meant a beverage in liquid form ready to be consumed without further addition of liquid. A beverage according to the invention may comprise any other suitable ingredients known in the art for producing a beverage, such as e.g. sweeteners, e.g. sugar, such as invert sugar, sucrose, fructose, glucose, or any mixture thereof, natural sweetener; natural aromas and flavors, e.g. cocoa, coffee, or tea aroma and/or flavor; milk; stabilizers; natural colors, or combination of thereof.

A ready-to-drink beverage may be subjected to a heat treatment to increase the shelf life or the product, UHT (Ultra High Temperature) treatment, HTST (High Temperature Short Time) pasteurization, batch pasteurization, or hot fill.

Milk protein containing liquid beverages are beverages or beverage concentrates containing milk (e.g. fluid, fat-removed, lactose-removed, powder, concentrate, fractionated) or the proteins obtained, whether native or modified, from milk, or a mixture thereof.

According to a particular embodiment, the pH of preheat treatment stage is controlled by the presence of an acidic component. The acidic component is preferably selected but not limited from the group consisting of lactic acid, glucono delta-lactone, phosphoric acid, ascorbic acid, acetic acid, citric acid, malic acid, hydrochloric acid, molasses, fruit derived acids and fermentation derived acids.

According to a particular embodiment, the product according to the invention comprises about 0 to about 2 wt/wt % fat, up to about 3.5 wt/wt % protein and sweetening agent, e.g. sugar from about 1 to 5 wt/wt %.

By "sweetening agent" it is to be understood an ingredient or mixture of ingredients which imparts sweetness to the final product. These include natural sugars like cane sugar, beet sugar, molasses, other plant derived nutritive and non-nutritive sweeteners. In one embodiment, the sugar is sucrose up to about 5 wt/wt %.

The products include an only one hydrocolloid which acts as stabilizer.

A "stabilizer" is to be understood as an ingredient which contributes to the stability of the beverage product with respect to shelf life. Thus, the stabilizer may comprise any ingredients which provide physical stability to the beverage.

It has been surprisingly found out that the presence of this controlled protein aggregation system in a beverage according to the invention improves the sensory profile of the product and in particular that it enhances considerably the smooth and creamy texture of said beverage that contains this system.

The present invention is a directed controlled protein aggregation system produced by an acidic component and specific heat treatment conditions, i.e. specific combination pH, temperature and holding time in proteins such as milk proteins, which has shown to considerably improve the mouthfeel and creaminess of the beverage of the invention.

Furthermore, the product of the invention has proven to be particularly stable, both when refrigerated as well as when kept at room temperature for consumption.

The invention relates in a further aspect to the use of a controlled protein aggregation system including casein and whey proteins for manufacturing a beverage in the presence of acid.

The invention relates in a further aspect of heating to temperature ranging from 136 to 150° C. and holding for 3 seconds to 30 seconds.

Such a system offers the unexpected advantage that it can confer to the beverage product exceptional sensory attributes with good stability while reducing fat and/or sugar content, while comprising only one hydrocolloid.

The homogenization step of the present invention may be performed in one or two steps. The two step homogenization approach comprises the first step wherein liquid mixture is exposed to a pressure in the range of 100 to 250 bars and followed by a second step having pressure in the range of 35 to 50 bars.

The applicant has discovered that combination of high acyl gellan gum with the following process parameters such as the pH, specific heat treatment and holding time results in a product with smooth, creamy texture and superior shelf life stability when compared to typical beverage products. In addition, it is critical to have a homogenization step before the specific heat treatment.

EXAMPLES

The present invention is illustrated further herein by the following non-limiting examples. In this and in the all other examples of the invention, concentrations of ingredients are given as wt/wt % based on the whole product formulation.

Example 1

The RTD beverages can be made by the following process:
Hydration (e.g., wetting) of cocoa powder for 45 minutes at 90° C. to form the cocoa slurry.
Mixing ingredients under agitation for 45 min
Sterilizing at UHT conditions at 136-150° C. for 3-30 seconds
Homogenizing the mixture at total pressure ranging from 135-300 bars and temperature ranging from 65–80° C.;
Cooling the obtained beverage base product to 25° C. or below; and
Filling aseptically UHT beverages in aseptic containers.

Example 2

The RTD beverages can be made by the following process:
Hydration (e.g., wetting) of cocoa powder for 45 minutes at 90° C. to form the cocoa slurry.
Mixing ingredients including acid under agitation for 45 min
Homogenizing the mixture at total pressure ranging from 135-300 bars and temperature ranging from 65–80° C.;
Sterilizing at UHT conditions at 136-150° C. for 3-30 seconds
Cooling the obtained beverage base product to 25° C. or below; and
Filling aseptically UHT beverages in aseptic containers.

Example 3

The RTD beverage was prepared as in Example 1 process, using 90 kg of fat-free milk, 200 g of nonfat dry milk, 160 g of co-processed microcrystalline cellulose (MCC) and carboxymethyl cellulose (CMC), 10 g of carrageenan, 12 g of high acyl gellan, 4.2 kg sugar, 500 g of cocoa, 100 g modified starch, 150 g of calcium carbonate and water necessary to reach 100 kg of the final beverage.

Beverage physico-chemical properties were evaluated and sensory characteristics were judged by trained sensory panelists. Gelation issues were found during shelf life.

Example 4

The RTD beverage with controlled protein aggregation was prepared as in Example 2, using 90 kg of fat-free milk, 200 g of nonfat dry milk, 25 g of high acyl gellan, 4.2 kg sugar, 500 g of cocoa, 150 g of calcium carbonate, 45 g of 80% lactic acid and water necessary to reach 100 kg of the final beverage.

Beverage physico-chemical properties were evaluated and sensory characteristics were judged by trained sensory panelists. Texture sensory attributes were found to be similar to that of the beverage prepared in Example 3, while no gelation issues were found during shelf life.

Example 5

The RTD beverage with controlled protein aggregation was prepared as in Example 2, using 90 kg of fat-free milk, 200 g of nonfat dry milk, 25 g of high acyl gellan, 4.2 kg sugar, 500 g of cocoa, 150 g of calcium carbonate, 25 g of 80% lactic acid and water necessary to reach 100 kg of the final beverage.

Beverage physico-chemical properties were evaluated and sensory characteristics were judged by trained sensory panelists. Phase separation including marbling and sedimentation was found during product shelf life.

Example 6

The RTD beverage with controlled protein aggregation was prepared as in Example 2, using 90 kg of fat-free milk, 200 g of nonfat dry milk, 25 g of high acyl gellan, 4.2 kg sugar, 500 g of cocoa, 150 g of calcium carbonate, 65 g of 80% lactic acid and water necessary to reach 100 kg of the final beverage.

Beverage physico-chemical properties were evaluated and sensory characteristics were judged by trained sensory panelists. Samples were found to be gritty, and gelation issues were found during shelf life.

Example 7

The RTD beverage with controlled protein aggregation was prepared as in Example 2, using 90 kg of fat-free milk, 200 g of nonfat dry milk, 4.2 kg sugar, 500 g of cocoa, 150 g of calcium carbonate, 45 g of 80% lactic acid and water necessary to reach 100 kg of the final beverage.

Beverage physico-chemical properties were evaluated and sensory characteristics were judged by trained sensory panelists. Low viscosity was found compared to the beverage prepared in Example 3, and phase separation issues were found during shelf life.

Example 8

The RTD beverage with controlled protein aggregation was prepared as in Example 2, using 90 kg of fat-free milk, 200 g of nonfat dry milk, 32.5 g of high acyl gellan, 4.2 kg sugar, 500 g of cocoa, 150 g of calcium carbonate, 45 g of 80% lactic acid and water necessary to reach 100 kg of the final beverage.

Beverage physico-chemical properties were evaluated and sensory characteristics were judged by trained sensory panelists. Gelation issues were found during shelf life.

Example 9

The RTD coffee beverages can be made by the following process:
  Mixing all ingredients except coffee under agitation for 20 min
  Dissolving coffee powder in 60° C. water for 20 minutes
  Adding coffee solution to the above mixture of ingredients
  Sterilizing at UHT conditions at 136-150° C. for 3-30 seconds
  Homogenizing the mixture at total pressure ranging from 135-300 bars and temperature ranging from 65–80° C.;
  Cooling the obtained beverage base product to 25° C. or below; and
  Filling aseptically UHT beverages in aseptic containers.

Example 10

The RTD coffee beverage was prepared as in Example 9 process, using 45 kg of whole milk, 10 g of high acyl gellan, 3 kg sugar, 1 kg of coffee powder, and water necessary to reach 100 kg of the final beverage.

Beverage physico-chemical properties were evaluated and sensory characteristics were judged by trained sensory panelists. Good physical-chemical stability and mouthfeel were found during shelf life.

Example 11

The RTD coffee beverage was prepared as in Example 9 process, using 45 kg of whole milk, 10 g of high acyl gellan, 3 kg sugar, 1 kg of coffee powder, 100 g of sodium bicarbonate, and water necessary to reach 100 kg of the final beverage.

Beverage physico-chemical properties were evaluated and sensory characteristics were judged by trained sensory panelists. Good physical-chemical stability and mouthfeel were found during shelf life.

Example 12

The RTD coffee beverage was prepared as in Example 9 process, using 45 kg of whole milk, 30 g of high acyl gellan, 3 kg sugar, 1 kg of coffee powder, and water necessary to reach 100 kg of the final beverage.

Beverage physico-chemical properties were evaluated and sensory characteristics were judged by trained sensory panelists. Good physical-chemical stability and mouthfeel were found during shelf life.

Example 13

The RTD coffee beverage was prepared as in Example 9 process, using 45 kg of whole milk, 30 g of high acyl gellan, 3 kg sugar, 1 kg of coffee powder, 100 g of sodium bicarbonate, and water necessary to reach 100 kg of the final beverage.

Beverage physico-chemical properties were evaluated and sensory characteristics were judged by trained sensory panelists. Good physical-chemical stability and mouthfeel were found during shelf life.

Example 14

The RTD coffee beverage was prepared as in Example 9 process, using 45 kg of whole milk, 20 g of high acyl gellan, 3 kg sugar, 1 kg of coffee powder, 50 g of sodium bicarbonate, 30 g of potassium citrate, and water necessary to reach 100 kg of the final beverage.

Beverage physico-chemical properties were evaluated and sensory characteristics were judged by trained sensory panelists. Good physical-chemical stability and mouthfeel were found during shelf life.

Example 15

The RTD coffee beverage was prepared as in Example 9 process, using 45 kg of whole milk, 40 g of high acyl gellan, 3 kg sugar, 1 kg of coffee powder, and water necessary to reach 100 kg of the final beverage.

Beverage physico-chemical properties were evaluated and sensory characteristics were judged by trained sensory panelists. Gelation issues were found during the storage.

Example 16

The RTD coffee beverage was prepared as in Example 9 process, using 45 kg of whole milk, 5 g of high acyl gellan, 3 kg sugar, 1 kg of coffee powder, and water necessary to reach 100 kg of the final beverage.

Beverage physico-chemical properties were evaluated and sensory characteristics were judged by trained sensory panelists. Phase separation was observed during the storage. Watery texture/mouthfeel was found.

Example 17

The RTD coffee beverage was prepared as in Example 9 process, using 45 kg of whole milk, 50 g of high acyl gellan, 3 kg sugar, 1 kg of coffee powder, 50 g of sodium bicarbonate, and water necessary to reach 100 kg of the final beverage.

Beverage physico-chemical properties were evaluated and sensory characteristics were judged by trained sensory panelists. Gelation issues were found during the storage.

Example 18

The RTD coffee beverage was prepared as in Example 9 process, using 45 kg of whole milk, 3 kg sugar, 1 kg of coffee powder, 100 g of sodium bicarbonate, and water necessary to reach 100 kg of the final beverage.

Beverage physico-chemical properties were evaluated and sensory characteristics were judged by trained sensory panelists. Severe phase separation was observed.

The invention claimed is:

1. A method of producing a ready to drink (RTD) beverage, the method comprising:
    mixing sugar and high-acyl gellan gum with at least one component selected from the group consisting of milk, non-fat dry milk, cream, skimmed-milk, and semi-skimmed milk;
    adding an acidifier to form a mixture;
    homogenizing the mixture at a temperature ranging from 65-80° C., the homogenizing comprising (i) a first step wherein the mixture is exposed to a first pressure and (ii) a second step wherein the mixture is exposed to a second pressure, wherein a total pressure is a sum of the first pressure and the second pressure and is 135-300 bars;
    sterilizing at ultra-high temperature (UHT) conditions at 136-150° C. for 3-30 seconds to obtain a beverage base product;
    cooling the obtained beverage base product to a temperature ranging from 0-25° C. to obtain the RTD beverage; and
    filling aseptically the RTD beverage in an aseptic container, wherein the high-acyl gellan gum is the only natural hydrocolloid in the RTD beverage.

2. The method of claim 1, wherein the first pressure is 100-250 bars, and the second pressure is 35-50 bars.

3. The method of claim 1, wherein the sugar is 1-5 wt. % of the RTD beverage.

4. The method of claim 1, wherein the high-acyl gellan gum is 0.01-0.03 wt. % of the RTD beverage.

5. The method of claim 1, wherein the RTD beverage comprises casein-whey protein aggregates having a volume-based mean diameter value D[4,3] of 5-10 µm as measured by laser diffraction and a viscosity ranging from 3-30 cP measured at 4° C. at a shear rate 75 $\sec^{-1}$.

6. The method of claim 1, wherein the acidifier is selected from the group consisting of lactic acid, ascorbic acid, citric acid and combinations thereof.

7. The method of claim 1, wherein the acidifier is lactic acid ranging from 0.03-0.06 wt. % of the RTD beverage.

8. The method of claim 1, wherein the RTD beverage is a milk-based beverage comprising cocoa.

9. The method of claim 1, wherein the RTD beverage is a coffee-based beverage, and the acidifier is coffee.

10. The method of claim 9, wherein the coffee is selected from the group consisting of soluble coffee, micronized coffee particles, coffee extract, coffee concentrate and combinations thereof.

11. The method of claim 9, wherein the coffee comprises at least one of *arabica* coffee or *robusta* coffee and has a total concentration of 0.5 wt. % to 1.5 wt. % of the RTD beverage.

12. The method of claim 1, wherein the RTD beverage further comprises an additional component selected from the group consisting of calcium carbonate, calcium phosphate, calcium lactate-citrate, calcium citrate, sodium bicarbonate, potassium bicarbonate and combinations thereof.

13. The method of claim 1, wherein the RTD beverage further comprises an additional component selected from the group consisting of sodium bicarbonate, potassium bicarbonate and combinations thereof.

14. The method of claim 1, wherein the RTD beverage comprises sodium bicarbonate in an amount ranging from 0 to 0.15 wt. %.

15. The method of claim 1, wherein the RTD beverage has a viscosity of 3-15 cP.

16. The method of claim 1, wherein the sugar comprises sucrose in an amount ranging from 0 to about 5 wt. % of the RTD beverage.

17. The method of claim 1, wherein the acidifier is citric acid ranging from 0.03-0.06 wt. % of the RTD beverage.

18. The method of claim 1, wherein the RTD beverage comprises whey proteins.

19. The method of claim 1, wherein the RTD beverage does not comprise any of carboxymethyl cellulose, hydroxypropyl cellulose, and carrageenans.

* * * * *